UNITED STATES PATENT OFFICE.

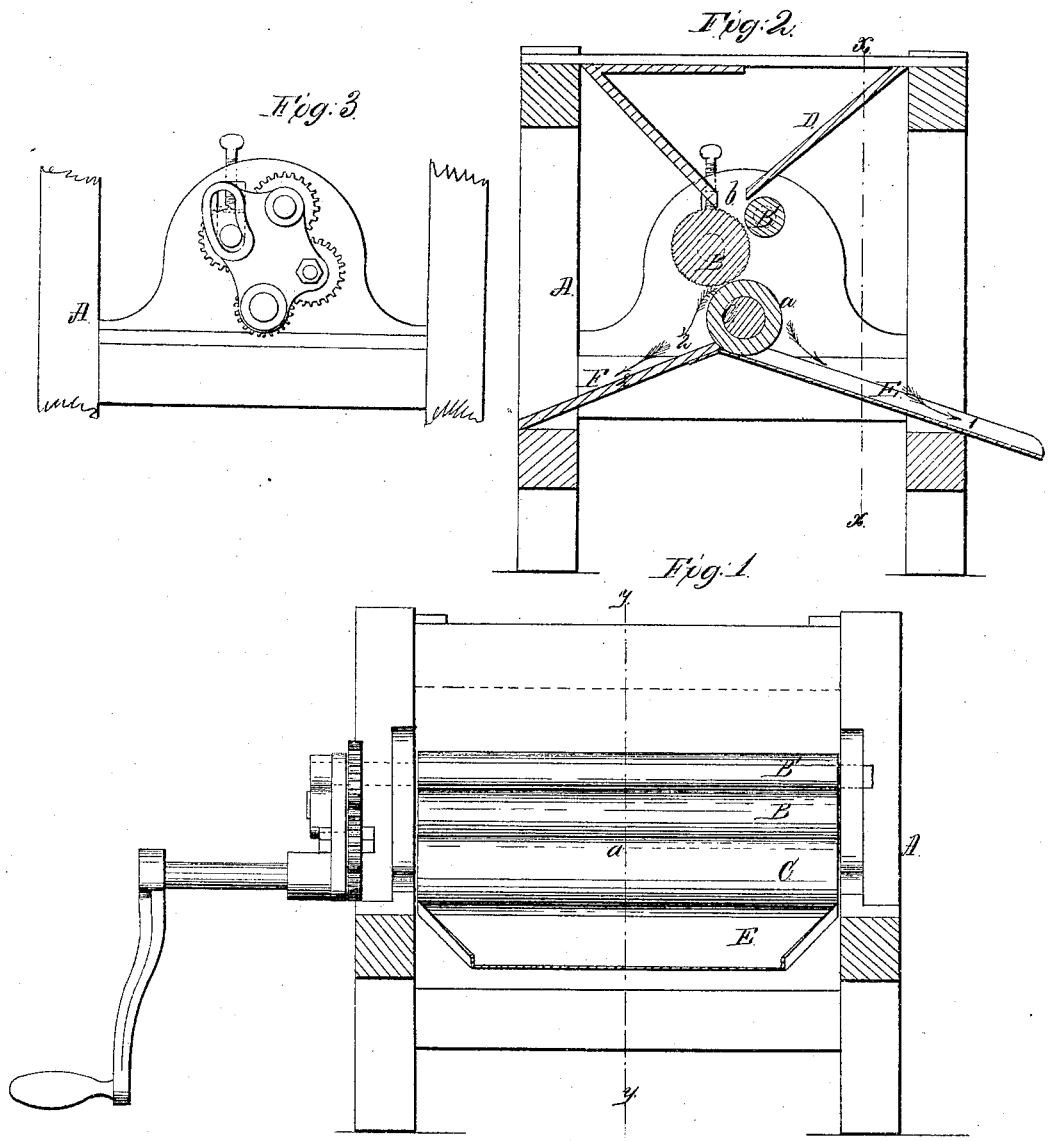

J. H. WILLIAMS, OF SANDUSKY, OHIO.

IMPROVEMENT IN CIDER-MILLS.

Specification forming part of Letters Patent No. 59,700, dated November 13, 1866.

*To all whom it may concern:*

Be it known that I, JOHN H. WILLIAMS, of Sandusky, in the county of Erie, State of Ohio, have invented a new and Improved Cider and Wine Mill; and I do hereby declare that the following is a full, clear, and exact description thereof, which will enable others skilled in the art to make and use the same, reference being had to the accompanying drawings, forming a part of this specification, in which—

Figure 1 is a front sectional view of my invention, taken in the line $x\,x$, Fig. 2; Fig. 2, a transverse vertical section of the same, taken in the line $y\,y$, Fig. 1; Fig. 3, a side view of a portion of the same.

Similar letters of reference indicate like parts.

This invention relates to a new and improved mill for grinding or crushing apples, grapes, and other fruit, for the purpose of expressing the juice therefrom for the manufacture of wine.

The invention consists of two rollers of iron, wood, or other hard material, in connection with a roller of india-rubber or other elastic material, all arranged in such a manner that the juice will be expressed from the fruit and the former separated from the crushed fruit or pomace.

A represents a framing, which may be constructed in any proper manner to support the working parts of the machine, and B B′ are two rollers, which may be constructed of metal or wood or other suitable hard material. These rollers are fluted longitudinally their whole length, and one of them, B, may be arranged so as to be adjustable, to admit of B being placed nearer to or farther from B′, as may be required.

C is a roller, having a covering, $a$, of india-rubber or other suitable elastic material, in contact with the roller B, and D is a hopper placed in the framing A directly over the rollers B B′, and having a discharge-opening, $b$, at its bottom, to direct the fruit between the rollers B B′, as shown in Fig. 2.

The fruit is crushed in passing down between the rollers B B′, and the juice passes down into a trough, E, which conveys it into any suitable receptacle, (see arrows 1,) and the pomace passes between the roller B and the elastic roller C, and is discharged into a trough, F, which conveys it into any proper receptacle. (See arrows 2.)

The rollers B B′ should be at a sufficient distance apart to prevent the seed of the fruit being crushed.

This invention has been practically tested, and has been found to answer a good purpose, performing the work expeditiously and in a perfect manner, and effectually separating the juice from the pomace.

Having thus described my invention, I claim as new and desire to secure by Letters Patent—

The combination of the two metallic or wooden rollers with the india-rubber or elastic roller, all arranged to operate substantially as and for the purpose set forth.

JNO. H. WILLIAMS.

Witnesses:
WM. F. MCNAMARA,
ALEX. F. ROBERTS.